No. 689,109. Patented Dec. 17, 1901.
D. E. MORAN.
BOLT CONNECTION FOR GRINDING PLATES.
(Application filed Apr. 5, 1901.)
(No Model.)

WITNESSES:
Joseph H. Niles.
George B. Gabel.

INVENTOR
Daniel E. Moran,
BY
Goepel & Wahle
ATTORNEYS

UNITED STATES PATENT OFFICE.

DANIEL E. MORAN, OF NEW YORK, N. Y.

BOLT CONNECTION FOR GRINDING-PLATES.

SPECIFICATION forming part of Letters Patent No. 689,109, dated December 17, 1901.

Application filed April 5, 1901. Serial No. 54,416. (No model.)

*To all whom it may concern:*

Be it known that I, DANIEL E. MORAN, a citizen of the United States, residing in New York, borough of Manhattan, in the State of New York, have invented certain new and useful Improvements in Bolt Connections for Grinding-Plates, of which the following is a specification.

The bolt connections heretofore in common use in ball-grinding mills were composed of bolts having wedge-shaped shanks which were set in wedge-shaped openings in the grinding-plates and held in position by nuts screwed on the outer threaded ends of said bolts. This bolt connection was not satisfactory for the reason that the constant jar of the grinding-balls upon the grinding-plates and inner ends of the bolts caused the loosening of the nuts and the breaking of the bolts.

The object of my invention is to furnish an improved bolt connection for the plates of grinding-mills in which the defects of the connection referred to are overcome and a more reliable and effective bolt connection obtained; and the invention consists of a bolt connection for the plates of grinding-mills which comprises a wedge-shaped bolt, wedge-shaped keys interposed in the opening of the grinding-plate between the same and the wedge-shaped shank of the bolt, and a nut screwed on the outer threaded end of the bolt, as will be fully described hereinafter, and finally pointed out in the claims.

Figure 1:
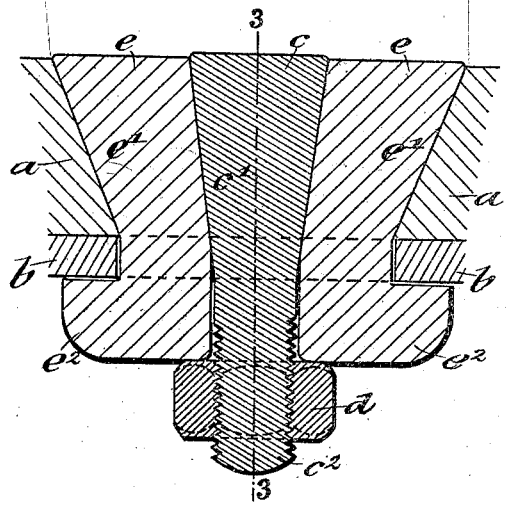
Figure 4:
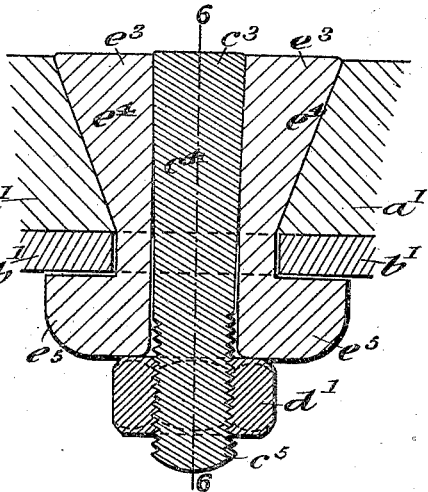
Figure 2:
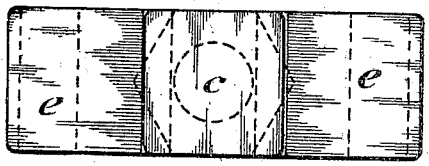
Figure 5:
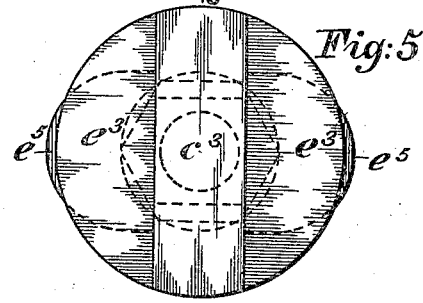
Figure 3:
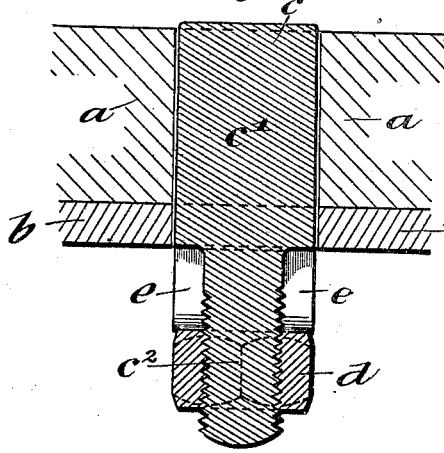
Figure 6:
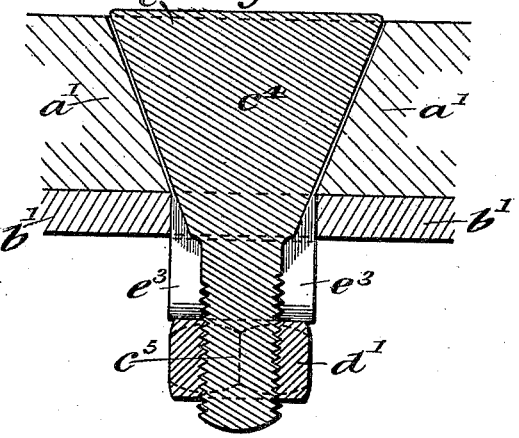

In the accompanying drawings, Figure 1 represents a vertical longitudinal section of my improved bolt connection for the plates of grinding-mills. Fig. 2 is a plan view of the same. Fig. 3 is a vertical section on line 3 3, Fig. 1. Fig. 4 is a vertical transverse section of a modified construction of bolt connection. Fig. 5 is a plan view of Fig. 4; and Fig. 6 is a vertical section on line 6 6, Fig. 4.

Referring to Figs. 1, 2, and 3 of the drawings, $a$ indicates a grinding-plate, and $b$ is the casing in which the grinding-plate $a$ is supported. $c$ is a bolt that is provided with a tapering shank $c'$ and threaded end $c^2$, and $d$ is a nut screwed on the threaded end $c^2$. $e\ e$ are angular keys that are provided with wedge-shaped shanks $e'$, seated in the correspondingly-formed tapering opening in the plate $a$, said keys passing through a registering opening of the shell $b$ and abutting at their outer ends by angular projections $e^2$ against the shell $a$. The shanks of the keys are preferably of rectangular cross-section and are firmly held in position by the nut that is screwed upon the end of the bolt. In place of being rectangular in shape the keys and seats may be made semicircular or conical in shape, as shown in Figs. 4, 5, and 6. In these figures, $a'$ is the grinding-plate; $b'$, the casing; $c^3$, the bolt; $c^4$, the shank of the same; $c^5$, its threaded end, and $d'$ the nut screwed on the same. $e^3$ are the angular keys; $e^4$, the shanks of the same, and $e^5$ their projections. The semicircular shape of the keys and seats is useful in cases where larger interlocking area and stronger bolt connection are desired.

My improved bolt connection has the advantage that the effect of the jarring action of the grinding-balls is considerably reduced, so that the breaking of the bolts by the jar and strain exerted on the same during the operation of the mill is prevented and a very reliable and strain-resisting bolt connection of the grinding-plates with the shell is obtained.

Having thus described my invention, I claim as new and desire to secure by Letters Patent—

1. A bolt connection for the plates of grinding-mills, consisting of a bolt having a wedge-shaped shank and a threaded outer end, keys inserted at both sides of the wedge-shaped bolt into openings of the grinding-plate and shell of the mill, and a nut screwed on the outer threaded end of the bolt and abutting against the outer ends of the keys, substantially as set forth.

2. A bolt connection for the plates of grinding-mills, consisting of a bolt provided with a wedge-shaped shank, wedge-shaped keys between said shank and the corresponding walls of the grinding-plate and shell, and a nut screwed upon the threaded outer end of the bolt and bearing on the outer ends of the keys, substantially as set forth.

3. The combination with a grinding-plate and the shell of a ball-grinding mill, said plates being provided with a tapering opening, and the shell with a registering opening, of a bolt passing through said openings and having a wedge-shaped shank and a threaded outer end, keys passing through said perforations at both sides of the bolt, said keys having wedge-shaped shanks and lateral projections at their outer ends abutting against said shell, and a nut on said bolt and bearing on the outer ends of said keys, substantially as set forth.

In testimony that I claim the foregoing as my invention I have signed my name in presence of two subscribing witnesses.

DANIEL E. MORAN.

Witnesses:
GEORGE GEIBEL,
JOSEPH H. NILES.